July 26, 1966   B. M. KOLLING   3,262,589
REFUSE DISPOSAL
Filed March 20, 1964   2 Sheets-Sheet 2
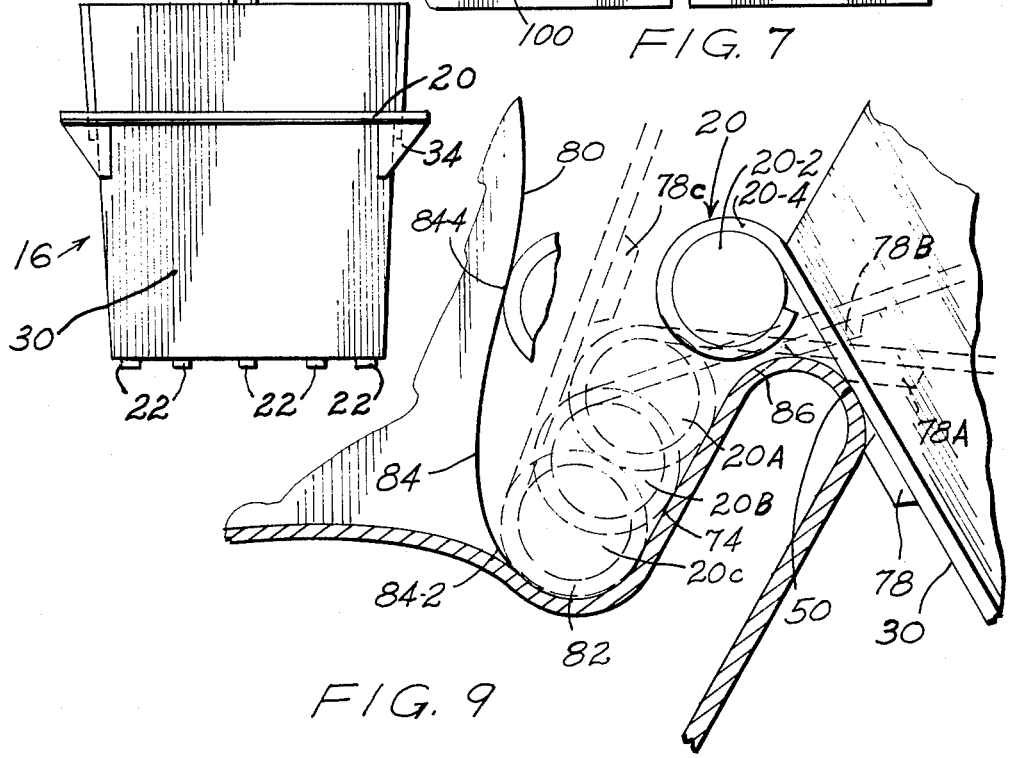
INVENTOR.
BYRON M. KOLLING

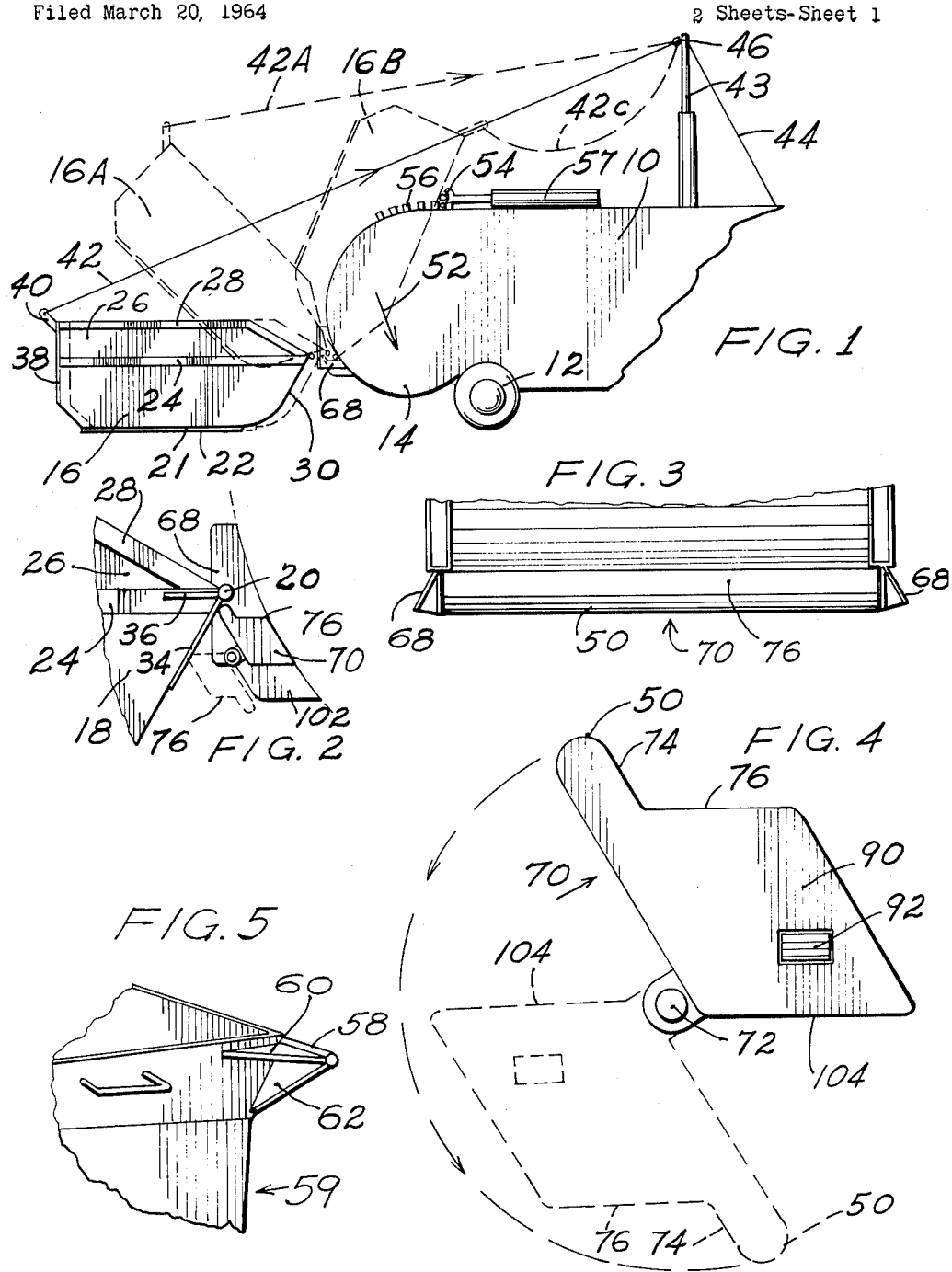

United States Patent Office 3,262,589
Patented July 26, 1966

3,262,589
REFUSE DISPOSAL
Byron M. Kolling, 23W026 Geneva Road, Glen Ellyn, Ill.
Filed Mar. 20, 1964, Ser. No. 353,492
11 Claims. (Cl. 214—302)

My invention relates to refuse disposal.

One object of the invention is to secure a great reduction in the precision with which a refuse receptacle and a transport vehicle to be load from the receptacle need to be manipulated in order to enable the loading mechanism to be connected up.

Another object is to arrange for quick and convenient change of the vehicle from one adjustment adapted to function with power loading to a different adjustment with a much lower opening to receive material, to facilitate hand-loading.

Another object is to arrange for substantial jolting of an up-ended receptacle loaded by power, to help dislodge the contents thereof.

Other objects and advantages will become apparent as the description proceeds.

Within the past few years, the dominant type of refuse disposal has been shifted over to a system involving the use of a very large container body positioned horizontally on a motor vehicle chassis. The rear end of the body is normally open, or only closed by a removable closure, and the lower part of the body projects farther back than the rest to define a shallow, upwardly opening receptacle commonly called the hopper. The hopper has parallel vertical end walls constituting the rear portions of the side walls of the main body. The bottom of the hopper is cylindrical with a transverse horizontal axis, and it may subtend an angle from about 70° to 120° around that axis in different designs.

For power loading, until quite recently, the initial collection was in large sheet metal boxes of capacity amounting to one or two cubic yards. These power-loading containers had transverse dimensions greater than their longitudinal dimensions with respect to the longitudinal dimension of the vehicle to be loaded. They were customarily mounted on caster wheels so that they could be trundled around by hand and pushed up by hand into abutment with suitable loading mechanism at the rear end of the vehicle. This required manual positioning of these large and heavy containers with considerable accuracy in just the right position, and handling of cables and locking levers of considerable weight to achieve a complete mechanical connection between the power mechanism on the vehicle and the pivots customarily provided at the upper front corners of the receptacle, which pivots were received by sockets on the vehicle. Then the receptacle was moved by power into an upside-down position substantially higher than its initial position so that the contents of the receptacle, if dislodged, could cascade down into the hopper with reasonable clearance to allow the receptacle to become completely empty.

In such equipment, the initial lifting of the heavily loaded container off the ground is usually accomplished by tension in a cable that passes quite close to the pivot and where the physical load has to be carried by the pivot, this imposes a force three or four times as great as the weight of the container and its contents. In practical experience, even though braced by two or more gusset plates, these pivots are often bent badly out of line, and the container is no longer usable. According to the invention no such load is ever imposed on the abutment means carried by the container.

More recently, much larger receptacles with capacities of four, five, and six cubic yards and sometimes even more, have achieved increased economy. These larger containers are too heavy to be trundled around by hand, and are usually provided with reinforcing beams along their bottoms which slide on the ground and function as skids. Power means is obviously required for sliding them over the ground, and, to get the vehicle which provides the power properly aligned with the receptacle, so that attachment of the receptacle to the vehicle can be done manually, has been a rather difficult chore because of the need for accurate alignment of parts to get them into fitting engagement.

According to the invention the lower edge of the opening into the vehicle body is provided with a straight horizontal supporting member having an upstanding lip at its upper edge and a horizontal supporting surface below and extending forward from the lower side of said lip. The small containers are provided along one of their longer sides with a top edge member for that side which is a lip offset forwardly from the side supporting it and adapted to take over the top of the upstanding supporting lip carried by the truck. Then, as the power mechanism rotates the container, the upper edge of the container side abutting said supporting lip slides over said supporting lip and the offset container lip member moves down in front of said supporting lip to a supported position on the horizontal supporting surface extending forward from said supporting lip. This brings the container from an initial position below and behind said supporting lip and opening upwardly, to a final position above and in front of said supporting lip opening downwardly, above said hopper and spaced above said hopper far enough to allow ample clearance for the contents of the receptacle to move out into said hopper.

The larger container may be provided with an identical configuration for engaging said lip, but that configuration is along the upper edge of an end wall of the container instead of a side wall. Thus the same lip can co-operate in the same way either with the side wall of a small container or the end wall of a large container.

In the case of either container, the side walls of the vehicle body, and the container, have abutting portions adapted to restrain the container from sliding inside the body. During movement of the container to its discharge position the force exerted forwardly and upwardly by pulling on the container might otherwise precipitate the entire container into the hopper.

Such collection vehicles, on their normal rounds, will encounter places where power-loading receptacles await them, and other places where ordinary garbage cans need to be emptied into the hopper, or miscellaneous trash picked up and thrown in by hand. With the supporting lip for power-loading at the correct height for getting a power-loading container well up above the hopper, this same supporting lip presents a serious obstacle to workmen desiring to throw trash into the hopper or to empty garbage cans into the hopper.

According to the invention this supporting lip is part of a hinged panel, closely analogous to the opening rear end of the common type of station wagon body, and when hand loading is desired one of the operators can release it from its locked and closed position and let it fall rearwardly and downwardly into a convenient shelf. This lowers the height to which garbage cans need be lifted and trash need be thrown, and the projection of the shelf beyond the body renders it available as a supporting surface on which one end of a garbage can can rest while the other end is pushed up to invert the garbage can. Since the front edge of this shelf adjoins the adjacent bottom of the hopper, the space into which the garbage can discharges is below the level of the shelf.

In the accompanying drawings:

FIGURE 1 is a partial side elevation of a disposal unit according to the invention;

FIGURE 2 is an enlarged detail of the front end of the container in its first position of engagement with the supporting means on the vehicle;

FIGURE 3 is a fragmentary plan view of the supporting means indicated in FIGURE 2 with the container absent;

FIGURE 4 is a greatly enlarged diagram of the tailgate or supporting panel;

FIGURE 5 is a fragmentary perspective view of part of a standard small container;

FIGURE 6 is a view of the locking means for fastening the panel in the position of FIGURE 2;

FIGURE 7 is a partial view, as on line 7—7 of FIGURE 2, indicating the position of the locking means in connection with associated parts;

FIGURE 8 is a front end view of the container of FIGURE 1;

FIGURE 9 is a greatly enlarged diagram indicating one arrangement for guiding the container in its movement toward emptying position in an irregular way; and FIGURE 10 is a diagrammatic plan view indicating the effective alignment of the container of FIGURE 1 both as to its angular position and its lateral position.

In the embodiment selected to illustrate the invention I have indicated more or less diagrammatically the rear portion of a truck body 10 carried by conventional running gear at 12. The hopper is at 14 and there are a substantial number of different mechanisms on the market for putting a blade behind the material in the hopper and forcing the refuse, in front of the blade, under great force, into the body 10. This blade is occasionally called the "packer," and one such mechanism is illustrated in U.S. Patent 2,928,562 to Cyril Gollnick, issued March 15, 1960.

In FIGURE 1 the truck is associated with a large container 16 which may be of six or eight or ten cubic yards capacity. It has gently inclined side walls 18 and a flat bottom 21 normally kept spaced from the ground by a plurality of skids 22 (see FIGURE 8). The upper edges of the side plates 18 are stiffened by external beams 24 similar to the skids 22, and the container illustrated carries the superstructure consisting of additional side plates 26 with their edges reinforced by beams 28. It will be obvious that the superstructure 26, 28 may be omitted, when the additional capacity thus obtained is not needed.

The container has an inclined breast at 30 and at the apex of the intersection of this breast with the beams 24 there is a transverse abutment rod 32 suitably braced as by gusset plates 34 and 36, which gusset plates may extend all the way out to the end of the rod. The extending portions of this rod never serve as a pivot to carry the weight of the container or its contents.

The rear wall 38 of the container 16 carries a projecting eye 40 to connect with a tension cable 42, which pulls diagonally forward and upward under tension delivered from suitable means. Such means may be mounted on the body 10 but for the long container illustrated in FIGURE 1 I have indicated a mast 43, suitably reinforced as by guy wires 44, with means at 46 for taking up on the cable 42.

The container 16 is indicated in full lines in position where it makes initial contact with the loading means on the truck, and again in dotted lines just a little closer to the truck after the rod 20 has moved over a supporting lip 50 rigid with the truck structure. It will be obvious that shortening of the cable 42 will swing the container 16 up and forward, as indicated in FIGURE 1, until it may arrive at some such position as indicated at 16A in dotted lines and a subsequent final position at 16B in dotted lines with the cable 42 hanging slack at 42B. It will be obvious that the entire contents of truck can fall by gravity downward and a little forward as indicated diagrammatically by an arrow 52 in FIGURE 1.

The clockwise rotation of the container may be allowed to continue to the position 16B of FIGURE 1 and there arrested by a cross rod 54. A plurality of pegs 56 are provided on each of the side members of the body 10 so that an additional rod similar to the rod 54 can be laid between any two of these to arrest the movement of the container in any desired final position. To return the container, the rod 54 is pushed rearwardly by a small hydraulic ram 58 until its center of gravity is to the rear of its pivotal support and the cable 42 is again effective to control its position and is used to lower the container back to its original position on the ground.

In FIGURE 5 I have indicated conventionally one of the well known smaller containers of the prior art. This container 59 differs from the prior art container only in omitting guiding flanges on the ends of the rod 58, and providing this rod with reinforcing brace plates 60 and 62, which plates brace the rod clear out to its end. It will be obvious that the container of FIGURE 5 can engage the lip 50 with its rod 58 just as is indicated in FIGURE 9 for the larger container, and even be pulled up by the same cable 42, or by any one of a variety of mechanisms on the market.

With either type of container, throughout the loading movement, the lip 50 has direct contact with the structure of the container itself, and the entire weight is carried by the lip 50, rather than by laterally projecting pivots on the container. This contact extends across the entire width of the body 10, which is the entire length of the lip 50, which reduces the working load per inch of bearing length to 10% or less of what it is when a laterally extending pivot on the container is employed.

It will be obvious that if the truck and container are maneuvered to a position where the cable 42 can be attached to the container, power is available to complete the movement of the parts from the spaced-apart position of FIGURE 1 in to the relative positions indicated in FIGURE 9 with the rod 20 overlying the lip 50 and the breast 30 pressing against the lip 50.

In FIGURE 10 I have indicated the automatic functioning of the equipment to straighten up the container angularly by means of the cable 42. In that figure the body 16 is illustrated placed at an angle out of line with the longitudinal dimension of the truck 10. But as soon as tension is exerted on the cable 42 there will be an abutment at 66 preventing forward movement of the near corner of the container 16 and as soon as the tension in the cable 42 is enough to substantially relieve the ground of the weight of the container, the container will immediately swing around to the dotted line position in perfect alignment with the truck in front of it.

I also provide at each side of the truck an inclined guide plate 68. It is only necessary to get the truck and the container within several inches of alignment laterally and the cable tension will draw one end of the rod 20 against one or the other of the plates 68, and the power of the loading mechanism is available to shift the container into correct alignment laterally as well as angularly.

Referring to FIGURES 4 and 9, the lip 50 is the uppermost portion of a pivoted tailgate 70. This is pivoted around a pivot 72 fixed in the frame of the vehicle. For power loading the tailgate occupies the full line position of FIGURE 4. It will be apparent that the rod 20 of container 16 or the rod 58 of container 59 can ride over the top of lip 50 and down a straight portion 74 at an angle of about 60° to the horizontal and come to rest anywhere along a flat surface at 76. Movement across the flat surface 76 into the container is prevented by simple abutment of the extended portions at the ends of the rod with the side frame of the truck 10.

Jolting

In FIGURE 9 I have indicated a modification of the contour of the surface of the tailgate in front of the lip 50, involving means for causing the movement of the container to be abrupt for a short distance substantially at the end of its somersault. In FIGURE 9 the breast 30 carries a cleat 78 which abuts the lip 50 and will normally arrest the sliding of the breast 30 up on the lip.

If there is no such cleat the breast can continue to slide up on the lip 50 until the rod 20 engages the rear edge of the truck body at some such point as 80 (see FIGURE 9), after which the continued force will let the rod slide down from contact at 80 to the final position indicated at 82. However, with the cleat 78 present, the cleat and breast define a re-entrant angle that will guide the container in rotation around the lip 50 into successive positions, identified in FIGURE 9 with reference to the position of the rod 20 as 20A, 20B, and 20C. In position 20A the re-entrant angle between the breast 30 and the cleat 78 is still effective and this may continue up to position 20B.

At about this angle one of two things may happen. Usually the cleat 78B will lift clear of the lip 50 by reason of the abutment between the rod 20 and the inclined surface at 74 and that will let the container move abruptly forward and downward so that the initial contact with the guiding surface at 84 constituting the rear edge of he side of the truck body will be at some such point as 84–2 and only a little further rotation will let the rod slide back to position 82. It may also happen occasionally that some jolting of the truck may dislodge the cleat 78 from position 78A, and the rod 20 will come forward and have a sharp impact at some such point as 84–4. This leaves the container supported by the breast 30 riding on the lip 50 with a minor fraction of forward thrust carried by the rod and further rotation of the container will move the rod downward into position at 82.

When the container is lowered again, the rod will remain in position 82 until the breast 30 moves the cleat 78 into abutment with the lip at the point 86 and around this fulcrum the rod will slide up the guiding surface 84 which is gently curved so that, in all positions of engagement, the path of the rod makes an angle with the radius from the fulcrum on lip 50 of only about 15°, so that the rod slides readily up on the curve until the rear end of the container engages the ground. The generated curve is not quite an exact logarithmic spiral because the fulcrum on the lip 50 shifts a little during the movement.

At this time the container may or may not slip back a little further to let its front end down, but if not, a little forward movement of the truck will let the breast 30 slide on the lip 50 until ground contact is at both ends.

The shallow trough at 82 is a convenient retainer for lubricant, and an ounce of oil spilled into it once or twice a day will oil up the container surfaces that have heavily loaded sliding movement during the loading process. The other surfaces of the container body may be treated by painting or equivalent protection. I prefer to paint the entire container structure initially, and a few months of service will take the paint off the load-bearing surfaces, leaving the painted area extending exactly up to the load-bearing areas, which receive a bit of lubricant every time they are used.

As best indicated in FIGURE 9, the rod 20 is, structurally, a compound member consisting of a core 20–2, and an outer envelope 20–4, which envelope is formed by rolling the upper edge of the breast plate 30 around the core 20–2. This rolling stress-hardens the metal that endures friction during use.

HAND LOADING

With the tailgate in the operative position for power loading, the lip 50 is a material obstacle when hand loading is required. As best indicated in FIGURE 4 the power loading position is illustrated in full lines with the end plates 90 of the tailgate assembly locked in that position by the bolts 92 of a conventional locking mechanism comprising an actuating plate 94 housed midway of the length of the tailgate and accessible through an opening at 96 in the rear face of the tailgate. Pitman's 98 transmit movement from the central plate 94 to the bolts 92 and the operator can manipulate the lever 100 to lock and unlock the tailgate.

The unlocked tailgate can be swung readily by hand to the position indicated in dotted lines in FIGURE 4 and FIGURE 2, where abutment between the tailgate structure and a frame member 102 on the truck prevents further counterclockwise rotation, and the bottom surface 104 of the tailgate assembly furnishes a convenient projecting shelf directly at the rear edge of hopper 14, so that trash can be thrown into the hopper by hand, or a heavy garbage can can have its upper end poised on the shelf 104 while the lower end is pushed up to discharge the contents into the hopper.

The tailgate structure can be left in the dotted line position FIGURE 4 in moving along to the next loading place, and if that loading place has a power-loading container the tailgate is swung up into full line position and locked there and the equipment is fully adjusted for the power loading operation.

The outward inclination of the side walls of the container 16 (which is somewhat exaggerated in FIGURE 8 so as to be readily noticeable to a searcher) is very useful because a half dozen or so containers can be nested in a single stack, like paper cups, for shipment by truck or by rail. In use, if damp refuse gets frozen into the container, it can be dislodged more easily by reason of this inclination.

Others may readily adapt the invention for use under various conditions of service by employing one or more of the novel features disclosed, or equivalents thereof. As at present advised, with respect to the apparent scope of my invention, I desire to claim the following subject matter.

1. Refuse disposal equipment comprising, in combination: a mobile vehicle having a storage body, said body having an open rear end adapted to receive the load; said opening having a substantially straight substantially horizontal lower side; a supporting structure defining said lower side; said structure having its upper edge shaped to define an upstanding supporting lip, and a relatively horizontal supporting portion extending forward from the lower limit of said lip; a power loading container comprising an upwardly opening receptacle having one front side shaped to engage said lower side of said body opening; said front container side wall having along its upper edge an overhanging lip portion offset forwardly from the general plane of said wall and adapted to take over the top of said supporting lip and move down onto the said horizontal supporting lip portion during rotation of said container about a transverse axis close to the axis of said supporting lip; power means for rotating said container, from an initial position below and behind said supporting lip opening upwardly, up around said supporting lip into an inverted position above and in front of said supporting lip opening downwardly; whereby the entire gravity load of the container during rotation is distributed along the length of said container lip and said supporting lip throughout the emptying and return movement of said container; and abutment means on said body and container for limiting forward sliding movement of said inverted container lip on said supporting lip portion, to retain said inverted container lip on said supporting portion.

2. Equipment according to claim 1 in which said lip and adjacent supporting portion are on a pivoted panel; said panel being pivoted about a horizontal axis along the lower edge of said panel, and moveable rearwardly and downwardly; and stop means limiting the downward movement of said panel to a position with said panel a rearwardly extending, substantially horizontal shelf.

3. Equipment according to claim 2 in combination with manually operable positive locking means for locking said panel in raised position.

4. Equipment according to claim 1 in which said container is approximately rectangular with its long sides extending parallel to said lip.

5. Equipment according to claim 1 in which said container is approximately rectangular with its short sides extending parallel to said lip.

6. Equipment according to claim 5 in which said container and body have registering irregularities of contour adapted to restrain descent of said container lip until said container has been raised to an intermediate angular position, and then release said cotnainer lip to drop down abruptly onto said horizontal supporting portion.

7. Equipment according to claim 1 in which said container lip is transversely slideable on said supporting lip; in combination with inclined guide means on said body adjacent to the ends of said supporting lip adapted to center said container transversely when said power means moves said container forwardly into engagement with said supporting lip.

8. Equipment according to claim 7 in which said container lip extends laterally at both ends, beyond the adjacent container wall; said extending lip ends engaging said guide means to center said container.

9. Equipment according to claim 1 in which said power means raises said container by tension force acting in the median fore-and-aft plane of said vehicle body, and pulling diagonally forward and upward; whereby, if said container is skewed laterally, the leading corner of said container will abut said body first and provide a fulcrum for swinging said container around a vertical axis into complete alignment with said vehicle.

10. Equipment according to claim 1, in combination with a retractable tension connector extending from said vehicle rearwardly above said containing lip and diagonally downward to the body of said container; said tension connector extending diagonally upward and forward; whereby retraction of said connector will slide said container forward to engage said container lip with said supporting lip, and additional retraction after said lips are in contact at one end or the other will firstly reduce the force of engagement of the container bottom with the ground enough to let said container swing gently around a vertical axis passing through the contacting lip ends, until lip to lip contact secured throughout the length of said lip, and secondly secure an abutment so that the main load can be imposed by said connector to lift said container and up-end it.

11. Refuse disposal equipment comprising, in combination: a mobile vehicle having a storage body, said body having an open rear end adapted to receive the load; said opening having a substantially straight substantially horizontal lower side; a supporting structure defining said lower side; said structure having its upper edge shaped to define an upstanding supporting lip; a power loading container comprising an upwardly opening receptacle having one, front side shaped to engage said lower side of said body opening; said front container side wall having along its upper edge an overhanging lip portion offset forwardly from the general plane of said wall and adapted to take over the top of said supporting lip during rotation of said container about a transverse axis close to the tip of said supporting lip; power means for rotating said container, from an initial position below and behind said supporting lip, opening upwardly, up around said supporting lip into an inverted position above and in front of said supporting lip opening downwardly; whereby the entire gravity load of the container during rotation is distributed along the length of said container lip and said supporting lip throughout the emptying and return movement of said container; and abutment means on said body and container for limiting forward sliding movement of said inverted container lip.

References Cited by the Examiner
UNITED STATES PATENTS

| | | | |
|---|---|---|---|
| 1,627,282 | 5/1927 | Gran | 220—1 |
| 2,186,529 | 1/1940 | Jones | 220—1 |
| 3,024,928 | 3/1962 | Freaney | 214—302 |
| 3,063,586 | 11/1962 | Appleman | 214—302 |

HUGO O. SCHULZ, *Primary Examiner.*

GERALD M. FORLENZA, *Examiner.*

A. GRANT, *Assistant Examiner.*